United States Patent [19]
Nowell

[11] Patent Number: 5,893,571
[45] Date of Patent: Apr. 13, 1999

[54] WHEELED AUTOMOBILE JACK

[75] Inventor: Charles P. Nowell, Salinas, Calif.

[73] Assignee: Joseph Fanucchi, Santa Rosa, Calif.; a part interest

[21] Appl. No.: 09/128,432

[22] Filed: Aug. 4, 1998

[51] Int. Cl.⁶ .................. B62D 21/14; B62D 53/00; B62P 3/06; B60B 29/00

[52] U.S. Cl. .................. 280/43; 280/413; 280/402; 414/429

[58] Field of Search .................. 280/413, 472, 280/43.17, 43.22, 402; 414/426, 427, 428, 429

[56] References Cited

U.S. PATENT DOCUMENTS

| | | | |
|---|---|---|---|
| 2,380,415 | 7/1945 | Carruthers | 414/429 |
| 2,476,493 | 7/1949 | Johnson | 414/428 |
| 2,491,034 | 12/1949 | Couch | 414/429 |
| 3,583,723 | 6/1971 | Nowell | 414/429 |
| 4,690,605 | 9/1987 | Coccaro | 414/429 |
| 4,900,215 | 2/1990 | Nowell | 280/402 |
| 5,678,838 | 10/1997 | Taylor | 280/413 |
| 5,709,520 | 1/1998 | Pish | 414/427 |

*Primary Examiner*—Robert J. Oberleitner
*Assistant Examiner*—Lynda Jasmin
*Attorney, Agent, or Firm*—Linval B. Castle

[57] ABSTRACT

A vehicle jack and dolly for quickly and easily raising the vehicle includes a support which is slipped around the bottom of the tire from the side of the vehicle, pivot bars and axles that are parallel to, spaced from and rotatable around the pivot bar. Short bars extending from the axles may be forced downward to rotate the axles and lift the vehicle to the point where a hook drops in place to lock it. The axles have small wheels so that two dollies may be used on two opposite wheels to move the vehicle.

8 Claims, 3 Drawing Sheets

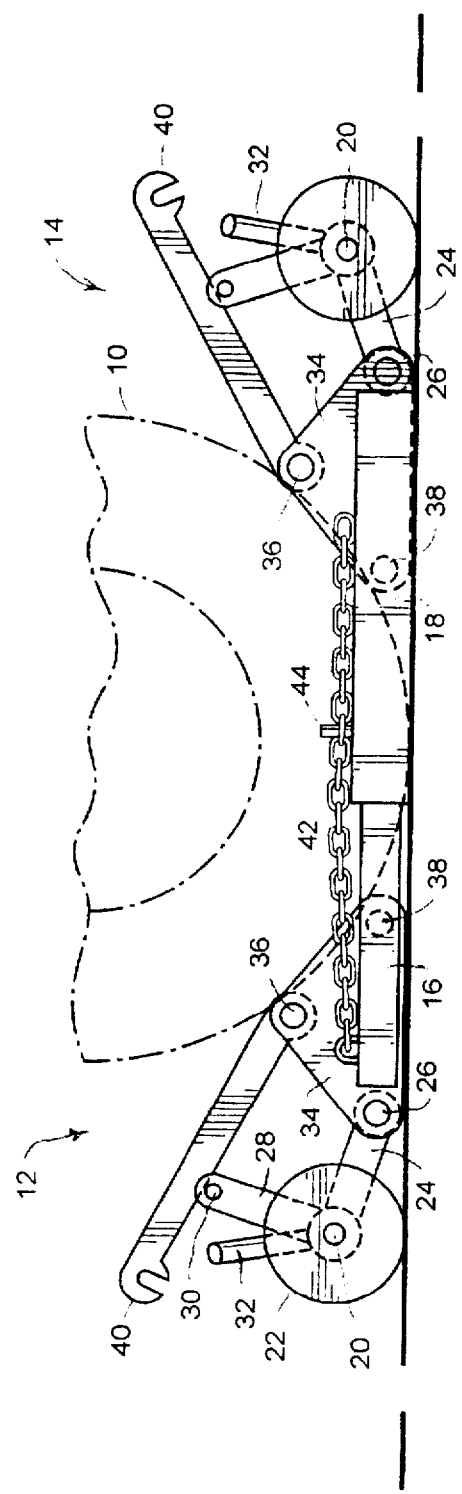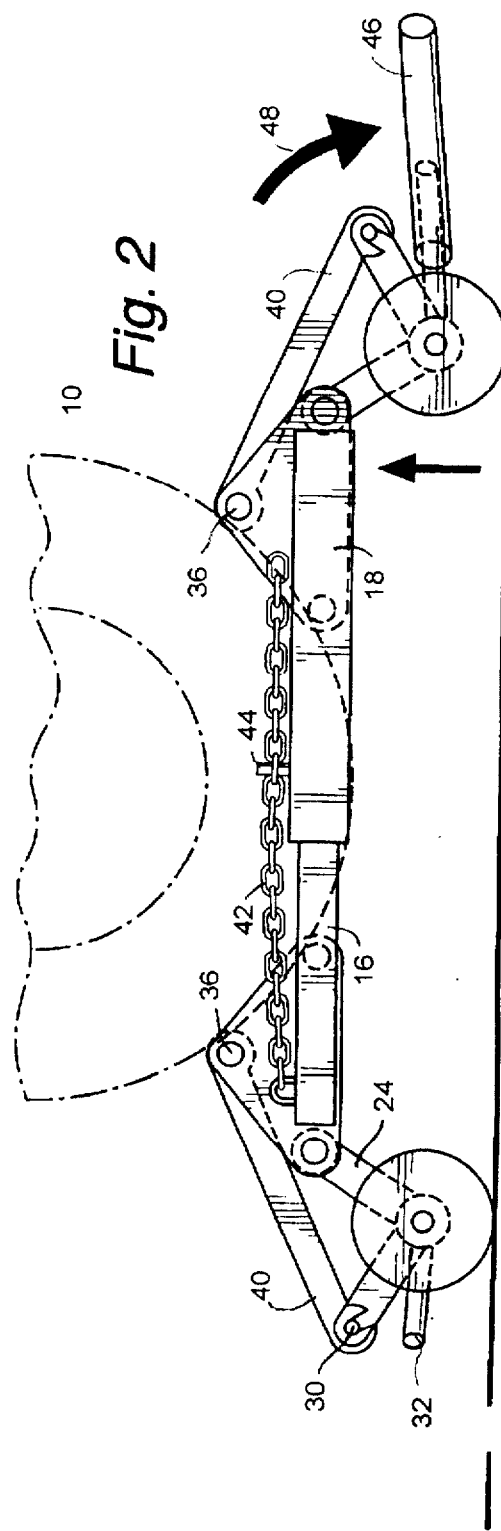

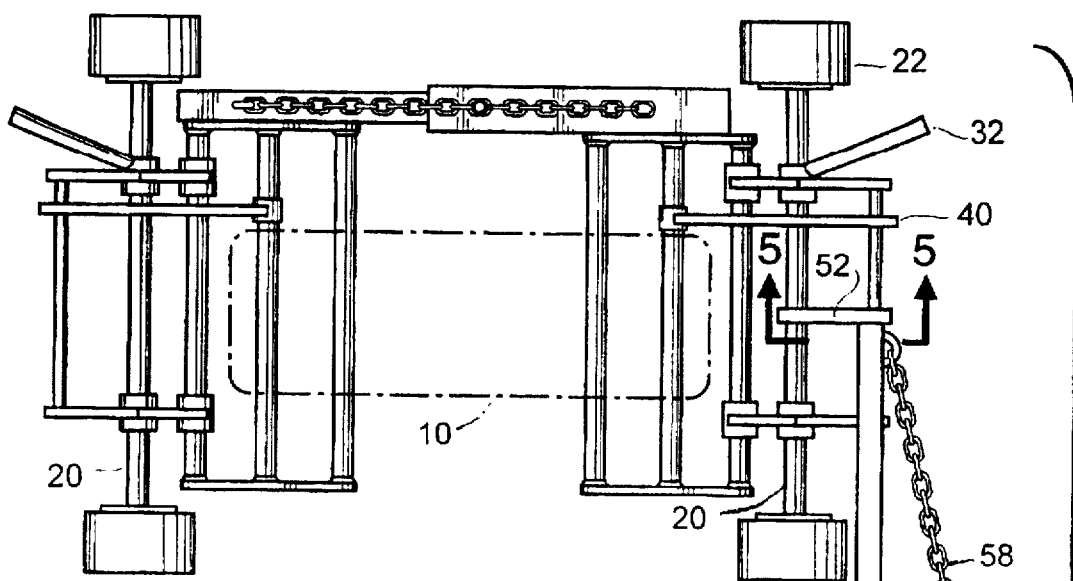
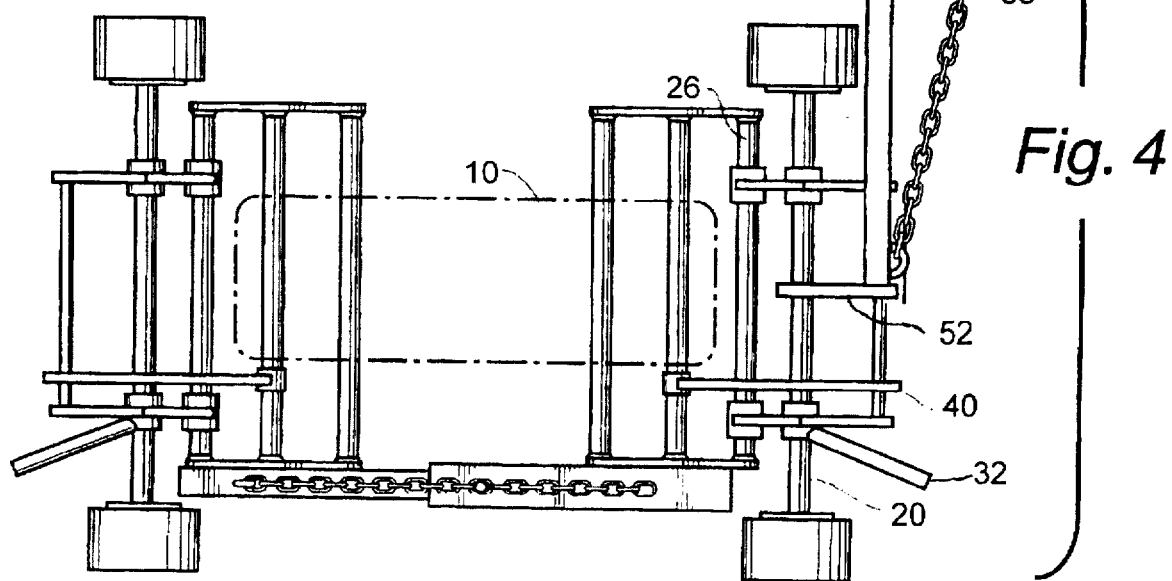
Fig. 5
Fig. 4

WHEELED AUTOMOBILE JACK

BRIEF SUMMARY OF THE INVENTION

This invention relates to automobile jacks and particularly to a wheeled jacking dolly that grasps an automobile tire and easily and quickly lifts the automobile off the ground so that it may be moved.

The jack to be described is primarily for use in automotive garages and tow trucks. It is approximately three feet long and 1-½ feet wide and is equipped with four small wheels. The jack is adjustable so that it can slide around any diameter vehicle wheel while the wheel is on the ground and lifting pins extending from each end are used to raise each half of the jack to a locking position which lifts the vehicle wheel approximately four inches.

Jacks of this type are a valuable asset to automotive garage mechanics where it becomes necessary to move a vehicle a few feet or to quickly raise a wheel of a vehicle. For example, if a differential became locked or if a vehicle were parked while in gear, it is only necessary to slide a dolly under each drive wheel, raise the vehicle from the ground to move it a short distance and then place a safety jack under the axle. It could also be valuable to police tow trucks in moving damaged or illegally parked vehicle on to vehicle carriers without attempting to open locked doors of the vehicle.

Briefly described, the vehicle jacking dolly are comprised of two identical halves that adjustably telescope together, each half formed of a two-bar tire support, a pivot bars and an axle supporting two wheels of four inches in diameter. When telescoped together the tire support and wheels may rest on the ground or the wheels may be easily and quickly lowered about the pivot bar to raise the tire support.

BRIEF DESCRIPTION OF THE DRAWINGS

In the drawings which illustrate a preferred embodiment of the invention;

FIG. 1 is a side elevational view of the jacking dolly in a lower or loading position;

FIG. 2 is a side elevational view of the dolly in a raised position;

FIG. 4 is a plan view of a tow bar coupled to two dollies; and

FIG. 5 is an elevation view of a tow bar hook taken along the line 5—5 of FIG. 4.

DETAILED DESCRIPTION

Figure 3:
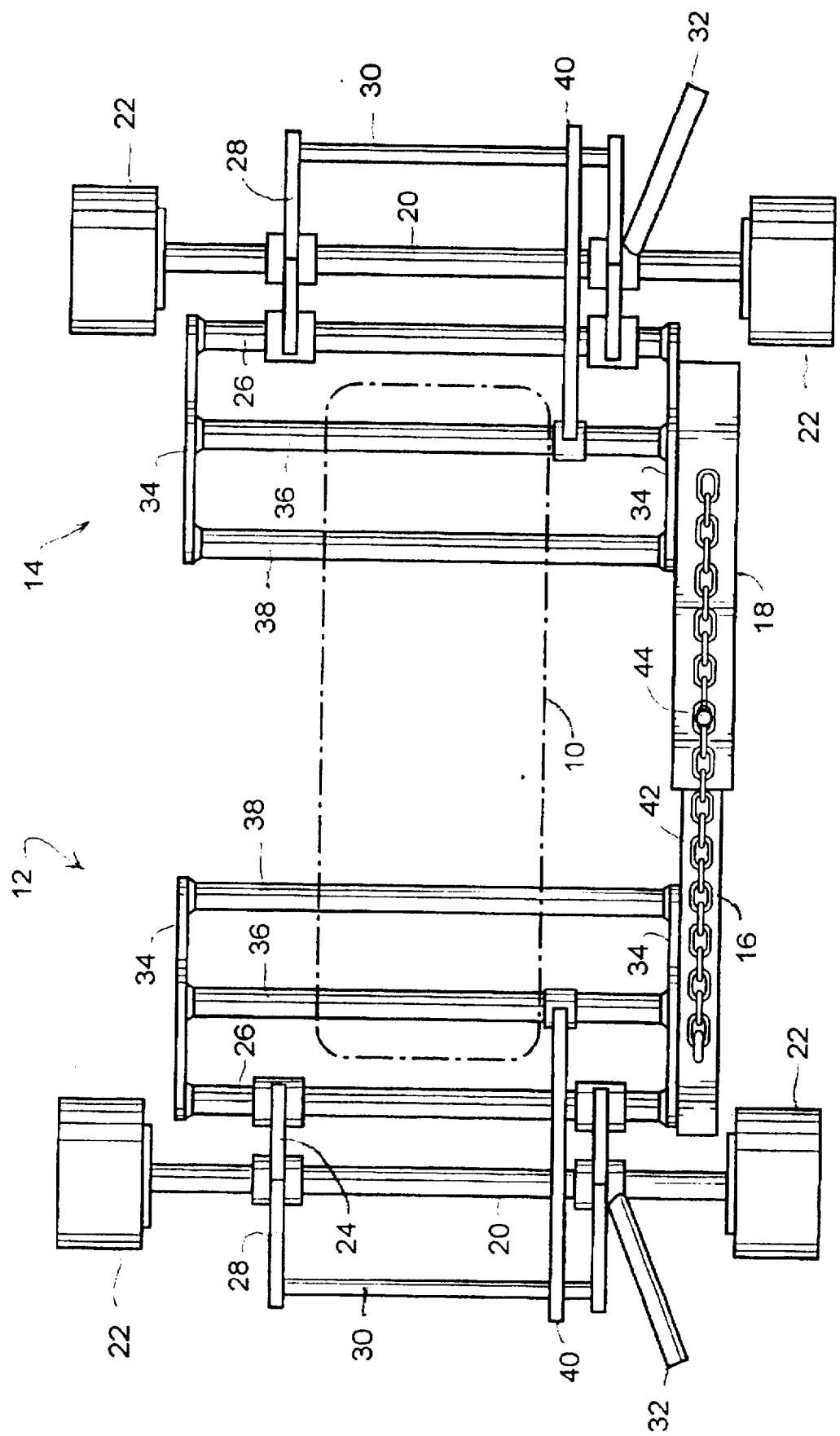
FIG. 3 is a plan view of the dolly.

The vehicle jacking dolly is a moveable dolly that may be inserted under the tire of a vehicle resting on the ground and which can jack up that vehicle easily and quickly. FIG. 1 illustrates the dolly in its lowered position around a vehicle tire 10 shown in broken lines.

As shown in the plan view of FIG. 3, the dolly is formed of two identical halves 12, 14, that are interconnected by a strong square steel tubular member 16 on the half 12 that telescopes into larger square steel tubular member 18 on the half 14. Each of the halves has a ¾" diameter axle 20 which supports two wheels 22 which in the preferred embodiment are six inches in diameter and three inches in width.

Each axle 20 is coupled by two short connecting bars 24 to a ¾" diameter pivot rod 26 that is parallel with the axles 20 and perpendicular to the telescoping tubular members 16, 18. The connecting bars 24 contains bushings for rotational coupling to the axles 20 and the pivot rods 26 so that the axles 20 and wheels 22 are not fixed but are rotatable about the pivot rod 26. The connecting bars 24 are also rigidly connected at each journal on the axles 20 to an extension member 28 which extends out past the periphery of each wheel 22. The outer ends of the extension members on each half of the dolly are interconnected by a bar 30 that is parallel with the axles 20. This bar 30 is used to lock the dolly in a raised position as will be explained later.

The journals on the axles 20 at the connecting bars 24 on the same side of the dolly as the telescoping tubular members 16, 18, support the ends of short ½" diameter rods 32 which extend upward and outward past the periphery of the wheels 22. These short diameter rods 32 are used, along with ½" I.D. pipe extensions, to pivot the axles 20 and wheels 22 around the pivot rods 26 to raise vehicles, as will be described later.

The pivot rods 26 of the preferred embodiment are ¾" diameter and 12" in length and are supported at each end by triangular steel plates 34 which are attached to one of the telescoping tubular member 16, 18 as best shown in FIG. 1. Steel plates 34 also support the ¾" diameter parallel bars 36, 38 that form the tire support. As shown in FIG. 1, bars 36 are at the top of the triangular steel plates 34 and the bars 38 are in a lower corner displaced about 45 degrees from the bars 36.

The bars 36 at the top of the steel plates 34 are journaled to the end of elongated hook 40 which can engage the bars 30 only when the rods 32 have been forced downward to lower the wheels 22 to lift the dolly, as shown in FIG. 2.

To lift a vehicle from the ground, the two halves 12, 14 of the dolly are slipped under the vehicle tire 10, as shown in FIG. 1. The hooks 40 are shown to be not engaged with the bars 30 and the axles 20 and wheels 22 are unlocked and are free to rotate on the pivot bars 26. The two halves 12, 14 of the dolly are now brought together, forcing the telescoping square tubular members 16, 18 together and a chain 42, one end of which is coupled to the tubular member 16, is hooked on a peg 44 on the tubular member 18 to prevent separation of the two members and a capturing of the vehicle wheel of any diameter.

A pipe extension 46 of convenient length is now slipped over the rods 32 which are slanted outward toward the side of the vehicle for easy access to them. The extension pipe 46 is forced downward, as shown by the arrow 48 in FIG. 2, until the hooks 40 drop into engagement with the bars 30 to lock the axles 20 and wheels 22 from further rotation. After the first half of the dolly has been lifted, the other half is raised in the same manner.

FIG. 4 illustrates the use of two dollies and a tow bar for moving a locked or damaged vehicle on to a vehicle carrier. The locked wheels 10 of the vehicle are jacked up on the two dollies. A 1" square steel tow bar 50 having a length of about 4-½" feet has hooks 52, as shown in FIG. 5, secured to each end. A connector ring 54 on an extension 56 extends forward from the center of the bar 50 and is strengthened by heavy chain 58 between the ends of the tow bar 56 and the ring 54. The hooks 52 are hooked over the axles 20 or the pivot bars 26 of the dollies and the ring 54 may be coupled to a cable of a powered windless on the bed of the vehicle carrier for drawing the vehicle up a ramp and upon the vehicle carrier.

I claim:

1. A jacking dolly comprised of firs and second identical frames coupled by a first tubular member on said first frame telescoping into a second tubular member on said second frame, each of said identical frames comprising:

a pivot bar, the ends of said pivot bar connected between structural plates, one of said plated being attached to one of said tubular members;

an axle parallel to said pivot bar and spaced therefrom by a journaled member coupled between said axle and said pivot bar, said axle coupled for rotation about said pivot bar, said axle supporting at least two wheels;

lifting means associated with said journaled member for rotating said axle and said wheels for raising said jacking dolly;

locking means associated with said journaled member for locking said rotated axle and said wheels; and at least one bar forming a vehicle tire support attached between said structural plates and parallel to said pivot bar.

2. The jacking dolly claimed in claim 1 wherein said lifting means is a bar having one end attached to said journaled member at said axle and slanted outward in a direction away from said jacking dolly, said bar adapted to be extended by an extension pipe for rotating said axle about said pivot bar.

3. The jacking dolly claimed in claim 1 where said locking means includes a hook coupled to said vehicle tire support bar, said hook engaging a bar coupled to and spaced from said axle when said dolly has been raised.

4. The jacking dolly claimed in claim 1 wherein said structural plates are triangular and said tire support includes two parallel bars having their end attached between said structural plates.

5. The jacking dolly claimed in claim 1 further including means for preventing separation of said two identical frames from separating including a chain having one end connected to one of said tubular members, said chain having links engagable with a pin extending from the other one of said tubular members.

6. The jack dolly claim in claim 1 wherein said axle supports two wheels, each having a diameter of approximately six inches.

7. The jacking dolly claim in claim 4 wherein said two parallel bars forming said tire support and said parallel axle and said pivot bar are ¾ inch diameter steel bars.

8. A method for moving an immobile vehicle said method comprising the steps of:

placing each locked vehicle wheel on a wheeled vehicle jack, said wheeled vehicle jack including: first and second identical frames coupled together by telescoping tubular members; each of said frames having a pivot bar at a right angle to said telescoping tubular members: an axle parallel and space from said pivot bar and supporting a wheel at each end, said axle being rotatable around said pivot bar; lifting means associated with said axle for rotating said axle around said pivot bar; locking means for locking said rotating axle; and vehicle tire supporting bars parallel to said and spaced from said pivot bar;

jacking up each of said locked vehicle wheels; and attaching a tow bar to said wheeled vehicle jack, said tow bar comprising an elongated bar with a hook at each end that engages one axle of each dolly, said tow bar also having coupling means at the center of said bar for coupling to a towing source.

* * * * *